United States Patent [19]

Frantz

[11] 4,113,451

[45] Sep. 12, 1978

[54] COMPRESSED GAS FILTER ASSEMBLY

[75] Inventor: Virgil L. Frantz, Salem, Va.

[73] Assignee: Graham-White Sales Corp., Salem, Va.

[21] Appl. No.: 804,733

[22] Filed: Jun. 8, 1977

[51] Int. Cl.² ............................................ B01D 53/00
[52] U.S. Cl. ..................................... 55/162; 55/163; 55/267; 55/389; 55/208
[58] Field of Search ................. 55/21, 33, 62, 75, 162, 55/163, 179, 267, 316, 387, 389, 208

[56] References Cited

U.S. PATENT DOCUMENTS

| | | | |
|---|---|---|---|
| 1,887,589 | 11/1932 | Farmer | 55/163 |
| 3,080,693 | 3/1963 | Glass et al. | 55/33 X |
| 3,225,518 | 12/1965 | Skarstrom et al. | 55/33 |
| 3,324,631 | 6/1967 | Kreuter | 55/163 |
| 3,365,861 | 1/1968 | Crowley et al. | 55/162 |
| 3,402,529 | 9/1968 | Frantz | 55/267 |
| 3,464,186 | 9/1969 | Hankison et al. | 55/163 |
| 3,472,000 | 10/1969 | Glass et al. | 55/163 |
| 3,552,096 | 1/1971 | Dayson | 55/163 |
| 3,775,946 | 12/1973 | Brazzel | 55/62 X |
| 3,890,122 | 6/1975 | Frantz | 55/267 X |
| 3,923,479 | 12/1975 | Glass et al. | 55/33 X |

*Primary Examiner*—Charles N. Hart
*Assistant Examiner*—Robert H. Spitzer
*Attorney, Agent, or Firm*—Wilmer Mechlin

[57] ABSTRACT

Assembly for filtering compressed gas having dual desiccant-containing filter units each equipped with pneumatically opened and closed inlet and outlet check valves and a pneumatically opened drain valve so connected to each other and a control valve for alternately receiving and exhausting actuating gas as to cause the inlet and outlet valves to close before opening and open after closing of the drain valve. Normally, one unit filters while the other is being regenerated in timed cycles under control of the control valve for maintaining an uninterrupted output of filtered gas, but a regulator valve in the actuating gas supply to the control valve prevents the units from cycling and forces both to filter when the pressure upstream or downstream of the assembly is below a predetermined level. Piping between regenerating valving connected to a filtered gas outlet of each unit and combining a check valve for passing gas freely from and a restricted orifice for restricting flow to the unit and applying the restricted flow directly to the desiccant, enables each unit during filtering to supply filtered gas under substantially constant pressure for reverse-flow regenerating and cooling of the desiccant in the other unit. For preventing freezing during cold weather, each unit has its drain valve positioned above the level of its contaminant-collecting sump and the intervening drain pipe both wrapped with a thermostatically controlled heating coil and foam-insulated within protective sheathing from ambient air.

11 Claims, 13 Drawing Figures

REGENERATING    UNFILTERED GAS    FILTERING

COMPRESSED GAS FILTER ASSEMBLY

BACKGROUND OF THE INVENTION

As in U.S. patents, such as Muller U.S. Pat. No. 3,434,427, Parks U.S. Pat. No. 2,765,868, Bouskill U.S. Pat. No. 3,396,825, Morrison U.S. Pat. No. 3,447,684 and Akerman U.S. Pat. No. 3,395,511, it is common practice for maintaining an uninterrupted output of filtered fluid to have a pair of filter units, one of which is being regenerated while the other is filtering and vice versa. When, as in Muller, Bouskill and Morrison, the fluid is a liquid, it also is not uncommon to connect the filtered liquid outlets of the two units and utilize the filtered liquid from the filtering unit for reverse-flow regeneration of the filter medium in the other unit. Parks even applies this latter practice to the filtering of compressed gas, but only as a supplement to the heating of the desiccant upon which he mainly depends for regenerating. Contrary to current practice as disclosed in Glass U.S. Pat. No. 3,060,393 and Hankison U.S. Pat. No. 3,464,186, Parks did not appreciate that in filtering a compressed gas with a desiccant, the efficiency of the regeneration is enhanced by expanding the regenerating gas before it reaches the desiccant and conducting the regeneration at a pressure approaching ambient.

Initially, as in Kennedy U.S. Pat. No. 2,955,673, the filtered gas used for the low pressure regeneration was drawn from the main reservoir of the compressed gas system in which the filter assembly was installed. However, to comply with federal and state regulations prohibiting diversion of main reservoir air in systems used for operating vehicular air brakes, the current practice is to store part of the output of filtered gas in a so-called purge or regenerating tank separate from the main reservoir and later draw the regenerating gas from that tank. This current practice, as applied to a continuous output dual filter assembly for compressed gas, is exemplified by Akerman's use of a purge tank separate from the main reservoir for each filter unit.

The shortcoming of separate purge tanks, such as disclosed in Akerman, is that, as the regenerating proceeds, the pressure in the purge tank is progressively reduced, with consequent reduction in the flow and regenerating efficiency of the low pressure gas passing through the desiccant. This shortcoming appears to have been first recognized in my copending application Ser. No. 766,437, filed Feb. 7, 1977, in which by using a common purge tank and the substantially constant pressure of the gas in the filtering unit, a constant reverse flow of low pressure gas through the desiccant in the other unit is maintained throughout the regeneration. It is to improvements on the assembly of my copending application that the present invention is particularly directed.

SUMMARY OF THE INVENTION

The primary object of the present invention is to provide an improved filter assembly for compressed gas having alternately filtering dual filter units, wherein filtered gas outlets of the units are connected through a check valve and bypassing restricted orifice at each unit for free-flow from and restricted flow to each outlet, whereby each unit during filtering supplies filtered gas at substantially constant pressure for reverse-flow regeneration of the desiccant in the other unit, thereby not only eliminating the need for a purge tank for storing regenerating gas but maintaining a substantially constant flow of low pressure gas through the desiccant throughout the regeneration.

Another object of the invention is to provide an improved compressed gas filter assembly of the character described in the preceeding object, wherein the restricted orifice of each unit is so positioned as to apply the low pressure regenerating gas directly to the desiccant so as to both regenerate and cool the desiccant in passing therethrough.

An additional object of the invention is to provide in a compressed gas filter assembly a filter unit having pneumatically closed inlet and outlet check valves and a pneumatically opened drain valve, wherein the valves alternately receive actuating gas from a control valve and exhaust that gas and the valves are so connected to each other and the control valve as to cause the inlet and outlet valves to close before opening and open after closing of the drain valve.

A further object of the invention is to provide a compressed gas filter assembly having a pair of filter units such as described in the immediately preceeding object, wherein the control valve receives actuating gas as filtered gas from an output of the assembly and is connected to each unit and timer-controlled so that one unit filters while the other is being regenerated and vice versa, the drain valve of each unit is connected for exhausting through both the outlet valve and the control valve, and a pressure regulator valve in the supply of actuating gas to the control valve prevents the units from alternating between filtering and regenerating cycles and forces both to filter when the pressure in the compressed gas system in which the assembly is installed drops below a predetermined level.

Another object of the invention is to provide in a compressed gas filter assembly an improved filter unit having pneumatically actuated inlet and outlet check valves and a pneumatically actuated drain valve, wherein, for preventing freezing in cold weather, the drain valve is mounted above the level of the unit's sump and a drain pipe connecting the drain valve and port is both wrapped with a thermostatically controlled heating coil and foam-insulated within protective sheathing from ambient air.

A further object of the invention is to provide in a compressed gas filter assembly a filter unit having pneumatically actuated inlet and outlet check valves and a pneumatically opened drain valve so connected to each other and a control valve for actuating gas as to cause the inlet and outlet valve to close before opening and open after closing of the drain valve and the valves are factory-connected by pipes of different size for preventing accidental misconnection in the field.

Other objects and advantages of the invention will appear hereinafter in the detailed description, be particularly pointed out in the appended claims and be illustrated in the accompanying drawings, in which:

DETAILED DESCRIPTION

Referring now in detail to the drawings in which like reference characters designate like parts, the improved compressed gas filter assembly of the present invention, in the illustrated preferred embodiment is a dual filter assembly resembling in several respects the dual filter assembly of my copending application, Ser. No. 766,437, filed Feb. 7, 1977. As in that application, the assembly of the preferred embodiment has a pair of alternately filtering filter units alternately connectable to a compressor or other source of unfiltered, dirty or contaminated compressed gas for together producing a continuous supply of filtered compressed gas. The preferred assembly is adapted for vehicular and industrial installations in which a continuous supply of filtered compressed gas is desired or required and may have the filter units mounted either adjacent to or remote from each other as befits the space available in the intended installation.

A typical use for which the illustrated assembly is particularly designed is in the compressed gas system of a diesel locomotive in which it ordinarily will be installed beyond the second of two main reservoirs connected in series to the output of the system's compressor to take advantage of the surface exposure and consequent cooling effect of the reservoirs on the hot air emitted by the compressor. A molecular sieve is preferred as the desiccant of the assembly not only for its superior adsorption over an extended temperature range but also for its ability to selectively adsorb a variety of contaminants, including the moisture present in locomotive compressed gas systems. Along with other desiccants, molecular sieves adsorb most efficiently in a temperature range below 100° F. (37.77° C) and placement of the assembly in a locomotive system beyond the second reservoir thus reduces the cooling otherwise required to be performed in the filter assembly if the desiccant is to operate most efficiently.

Designated as 1, the preferred filter assembly of the present invention is comprised of dual, or a pair or plurality of filter units 2a and 2b, each equipped or fitted with pneumatically closed inlet and outlet check valves 3 and 4, respectively, and a pneumatically opened, spring-closed drain valve 5. Each or individually alternating between filtering and regenerating or purge cycles, the filter units 2a and b are alternately connected to a common supply or feed line 6 from the second reservoir or other source (not shown) of unfiltered, dirty or contaminanated compressed gas by manifolding or branch lines as appropriate to their proximity, so that one unit is filtering while the other is being regenerated and vice versa. If desired in the intended installation, the assembly 1 will include a common filter 7 connected to the outlet check valves 4 of the two units and especially suited for removing any dust from the filtered gas from the filter units before passing that gas to a common filtered gas output line 8 through which a continuous, constant or uninterrupted supply of filtered compressed gas is made available for powering gas-operated devices, such as air brakes, or other intended end uses.

Figure 4:
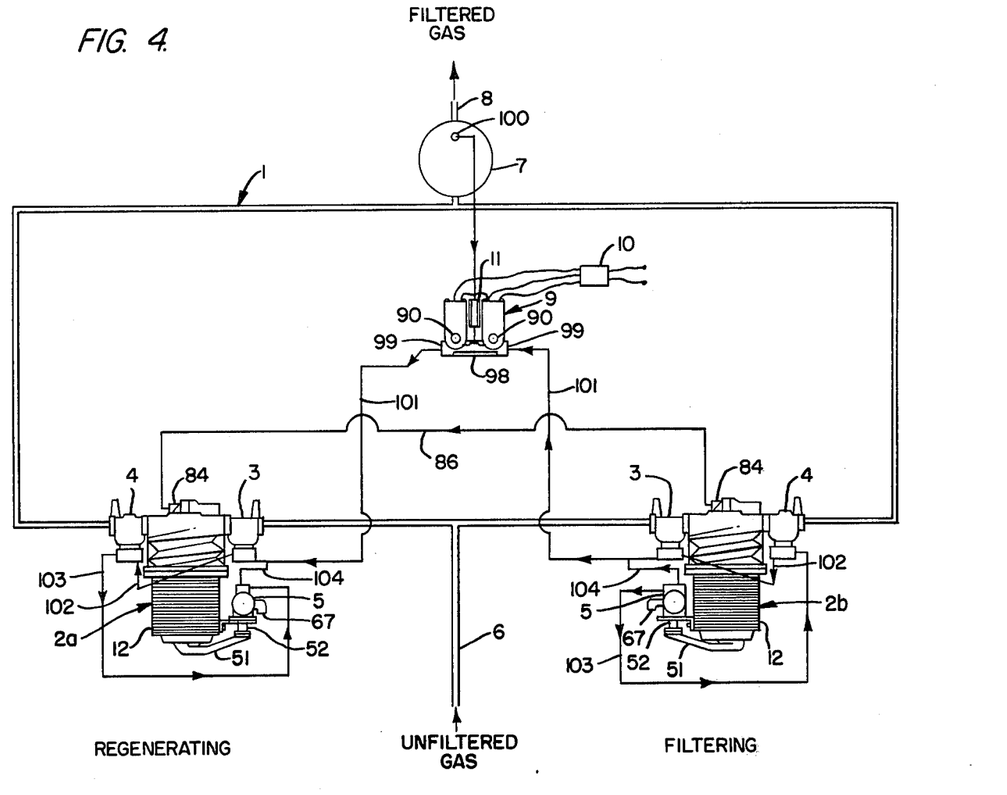
FIG. 4 is a schematic view of the entire assembly including the control valve and piping.

Shown schematically with the necessary piping in FIG. 4, the entire assembly 1 includes a preferably solenoid-actuated control valve 9 for alternately supplying to the filter units 2a and b compressed actuating gas, which by being alternately received and exhausted by the valves 3, 4 and 5 of each unit under control of the control valve, causes the filter units to alternate relative to each other in their filtering and regenerating cycles so that one filters while the other is being regenerated and vice versa. Suitably a single solenoid-actuated, multi-way valve, such as shown in my previously mentioned copending application, or the here disclosed duplex or double solenoid valve having a solenoid-actuated valve for each of the filter units, 2a and b, the control valve 9 in turn is controlled and predetermined in the time interval or duration of the cycle in which it supplies actuating gas to each filter unit by a preferably variable or adjustable solid state electrical timer 10 connecting the control valve to a source of appropriate electric power, usually 74 v. dc. For sensing and responding in the manner hereinafter to be described to a lower than normal pressure in the compressed gas system in which the assembly 1 is installed, the control valve 9 preferably uses as the actuating compressed gas for the filter units 2a and b, filtered compressed gas drawn from the output line 8 or, if present, conveniently the outlet side of the final filter 7 and there preferably is in the connection between the control valve and its source of actuating gas a pressure regulator valve 11 for shutting off the supply of actuating gas to the control valve when the pressure in the system falls below a predetermined level.

Figure 1:
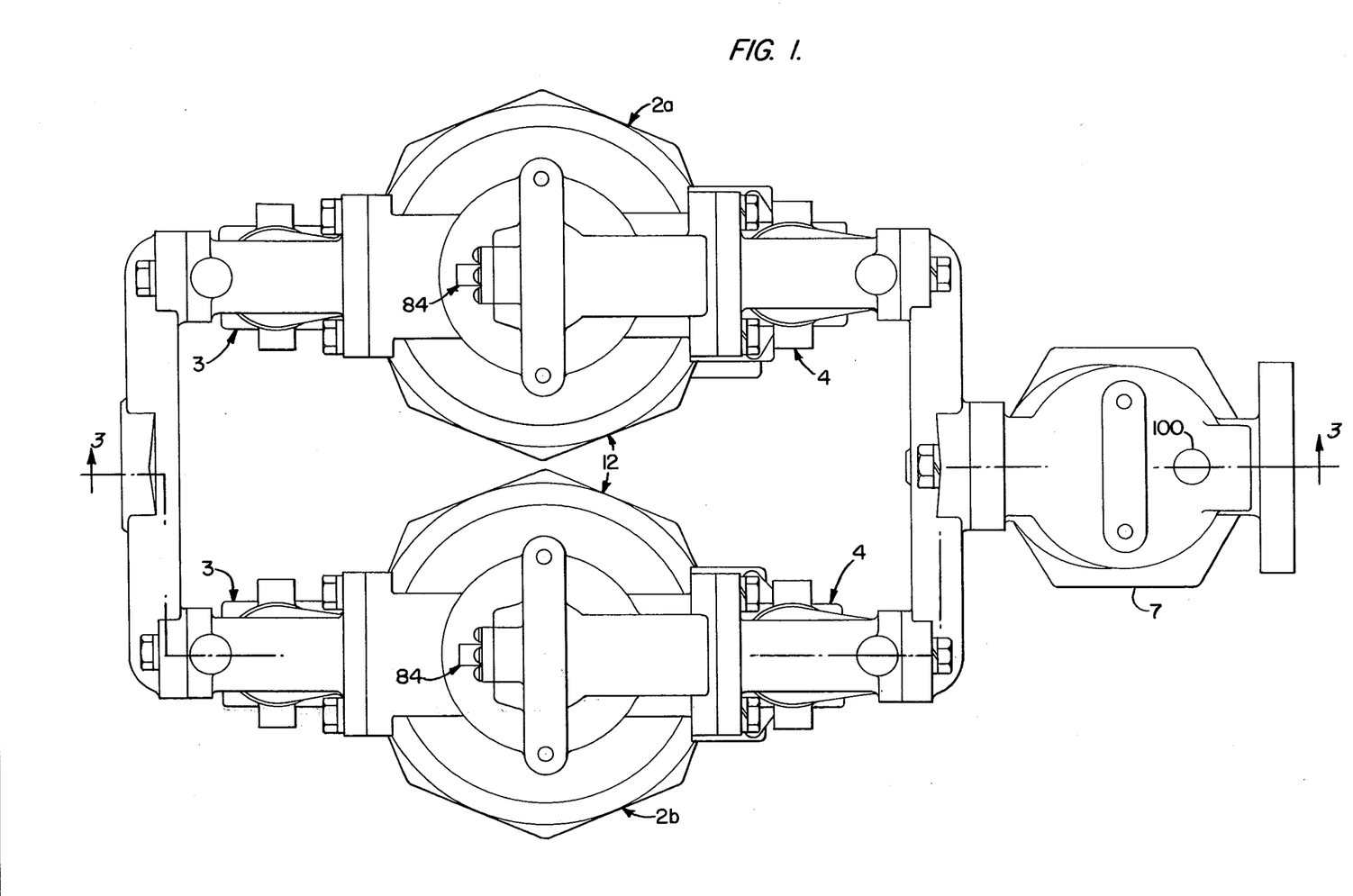
FIG. 1 is a plan view of a preferred embodiment of the compressed gas filter assembly of the present invention with the control valve and pipe connections removed.
Figure 2:
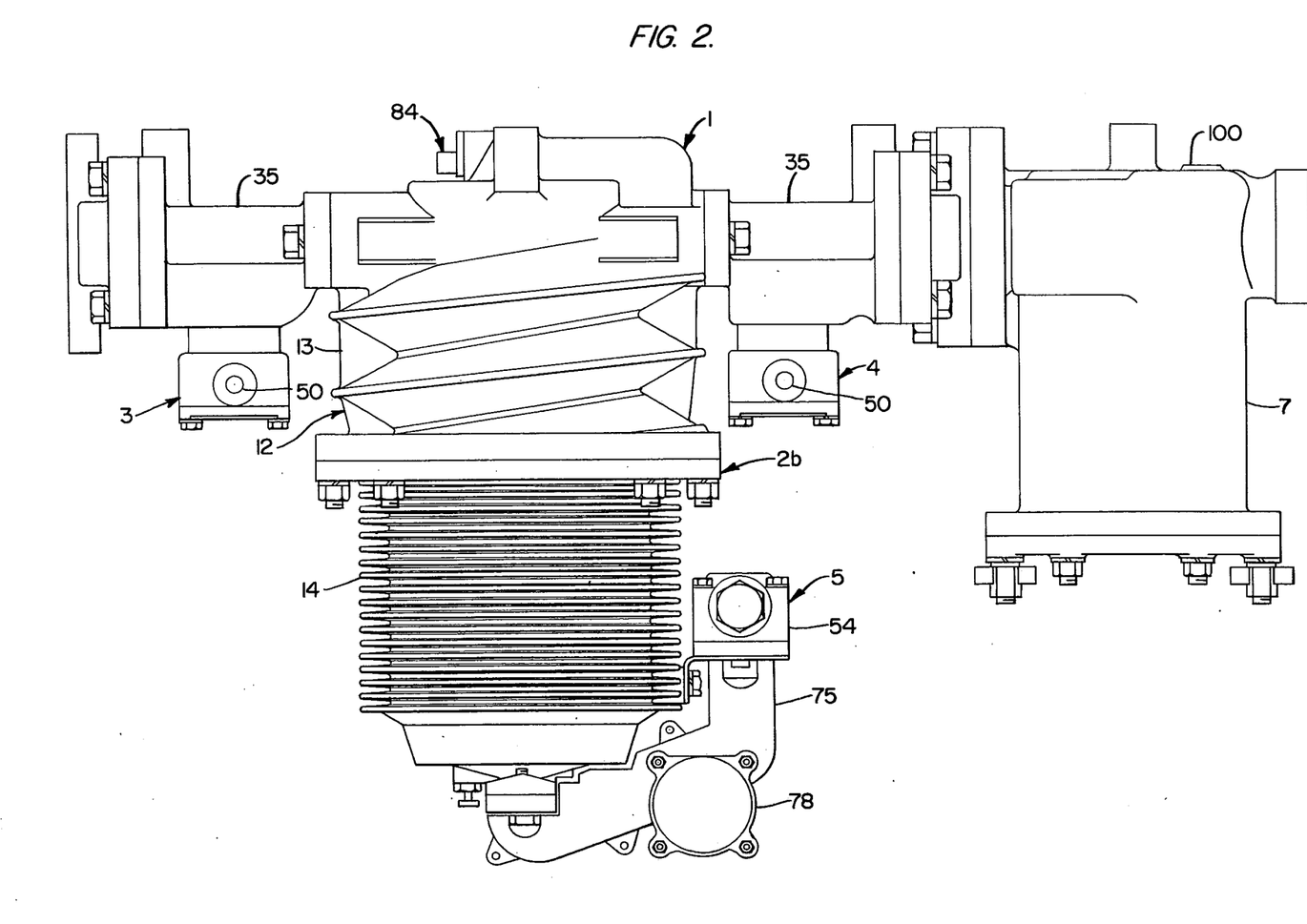
FIG. 2 is a side elevational view of the structure of FIG. 1.
Figure 3:
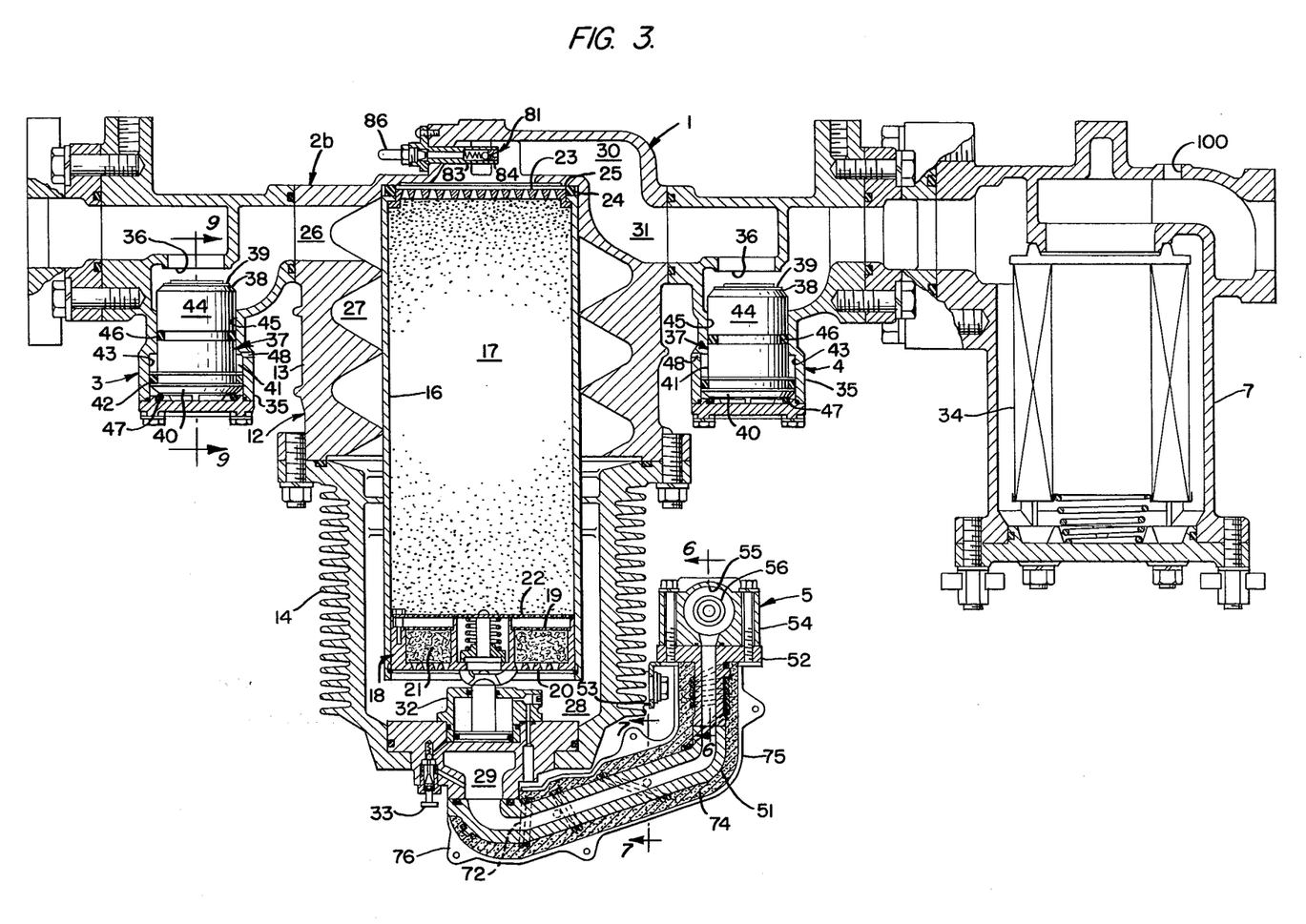
FIG. 3 is a vertical sectional view taken along lines 3—3 of FIG. 1.

The preferred filter units 2a and b are identical or counterparts or duplicates of each other and in their housings and internal structure are substantially identical with the filter units of my copending application Ser. No. 766,437. Thus, each of the filter units 2a and b is comprised of a vertically disposed, generally cylindrical housing or casing 12, divided vertically into releasably connected upper and lower parts 13 and 14, respectively, and having a suitably cylindrical vertical or axial bore 15 exposed on separation of the upper and lower parts for slidably receiving or seating a canister 16 containing a bed or column of a desiccant 17.

Preferably formed of molecular sieve beads or fine particles having a selective adsorption suitable for the intended use, the desiccant bed or column 17 fills the canister 16 except for the lower part thereof, which is occupied by a scrubber or scrubbing device 18 sandwiching between rigidly connected foraminous top and bottom plates 19 and 20, respectively, a suitably stainless steel wool annular pad 21 for entrapping or removing fine oil or like particles in advance of the desiccant, the scrubber preferably being so constructed as to be bypassable when the pad becomes clogged. Including a separator plate 22 engaging the confronting lower end of the desiccant column 17 and rigidly connected to and spaced above the top plate 22 for preventing oil trapped in the pad 21 from being drawn by capillary attraction into the desiccant bed 17, the scrubber 21, as a unit, is suitably retained and slidable vertically in the canister 16. The canister, itself, has a perforated or foraminous upper end 23 seating against and peripherally engaging, through an interposed annular sealing gasket 24, an opposed annular shoulder 25 in the housing 12 at the upper extremity of the bore 15.

Dirty, contaminated or unfiltered compressed gas enters or is introduced, injected or passed into the housing 12 through the inlet check valve 3 and an inlet port 26 in the housing leading inwardly to a downwardly direct helical passage 27 in the housing's upper part 13 between confronting sides thereof and the canister 16. The cyclonic flow induced in the entering compressed gas by the helical passage 27, which centrifugally cools and separates heavier contaminants from the incoming gas, is broken up by internal baffling in the housing's lower part 14 as the gas flows past the bottom portion of the canister 16 to an underlying sump 28 in the lower part. Opening downwardly onto a drain port 29 in the bottom of the housing 12, the sump 28 collects the separated contaminants and reverses the direction of flow of the compressed gas for upward flow through the canister 16 to an overlying outlet passage 30 in the upper end of the housing leading to an outlet port 31 from which the gas exits or is discharged through the outlet check valve 4 as filtered or decontaminated product compressed gas.

As shown in my copending application, Ser. No. 766,437 and now both shown and claimed in Lanier Frantz application Ser. No. 792,451, filed Apr. 29, 1977, the housing 12 contains in the sump 28 a pneumatic compactor 32 reacting downwardly against the housing and acting upwardly through the scrubber 18 as a floating follower on the desiccant bed 17 for compacting the desiccant beads and minimizing their relative movement under flow of gas therethrough and consequent dust formation by mutual abrasion. In process, the compactor 32 acts upwardly through the desiccant bed 17 on the canister 16 for forcing or urging the latter into tight engagement with the sealing gasket 24, thereby ensuring a gas-tight seal between the helical and outlet passages 27 and 30 and preventing shortcircuiting of incoming unfiltered gas to the outlet passage around the canister's upper end 23. As explained at length in the Lanier Frantz application, the pneumatic compactor 32 is automatically charged in any filtering cycle of its filter unit 2a or b and remains charged except when intentionally discharged by manual actuation of a plunger 33 to facilitate removal and insertion of the canister 16 on periodic inspections with the supply of unfiltered gas to the housing 12 shut off. In installations in which even a minimal amount of dust below the reach of the pneumatic compactor 32 is objectionable in the filtered compressed gas from the filter units 2a and b, the units, instead of being connected through their outlet check valves 4 directly to the output product gas line 8, are connected thereto through the intervening common final filter 7, which, for filtering or screening fine dust from the output compressed gas, suitably contains a removable and replaceable paper filter element 34.

The inlet and outlet check valves 3 and 4, conveniently are identical or counterpart, each having a body or casing 35 removably mounted, as by bolting, to the housing 12 in gas-tight communication with the adjoining, related, or associated of the housing's inlet and outlet ports 26 and 31 and the valves are termed pneumatically closed "check" valves to indicate that they are both closed and opened by pneumatic pressure, the latter the pressure of the compressed gas supplied to and discharged by the filter unit. Between its inlet and outlet ends, the body 35 of each of the valves 3 and 4 has a horizontally disposed valve seat 36 closeable by a suitably cylindrical, vertically reciprocable differential piston 37 conveniently mounted in the body below the valve seat. The piston 37 presents to the valve seat 36 a smaller or upper head or end 38 carrying or mounting a flat rubber or like washer 39 for sealing engagement with the valve seat and has a lower or larger head or end 40 riding or sliding in a bottom-closed or capped valve chamber 41 and carrying an O-ring 42 for sealing engagement with the chambers suitably cylindrical side 43. A stem or shank 44 of the piston between the heads 38 and 40 slides in and is guided by a cylindrical aperture 45 in the body 35 above and opening downwardly onto and of reduced diameter relative to the valve chamber 41. Peripherally grooved for the purpose, the shank 44 carries within the aperture 45 a second O-ring 46 for preventing flow of gas past the shank to or from the valve chamber 41, while a third O-ring 47 at the bottom of the chamber serves as a bumper for cushioning the piston's downward or opening movement. The side or side wall 43 of the valve chamber 41 is interrupted by three vertically staggered or spaced, substantially radial openings, the upper, adjacent the chamber's upper end, an exhaust 48, the lower, adjacent the chamber's lower end, an inlet 49, and the third, vertically intermediate or between the others, an outlet 50. In the piston's open position shown in solid line in FIG. 9, the larger head 40 is positioned below the outlet 50 so that the outlet is connected to the exhaust 48. As the piston 38 moves upwardly toward the closed position shown in dot-and-dash line in the same figure, the larger head 40 crosses the outlet 50 and in the process disconnects the outlet from the exhaust 48 and connects it instead to the inlet 49.

Figure 7:
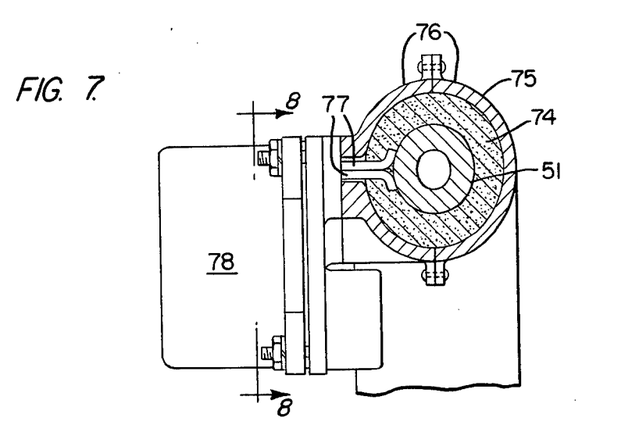
FIG. 7 is a vertical sectional view on the scale of FIG. 5, taken along lines 7—7 of FIG. 3.
Figure 8:
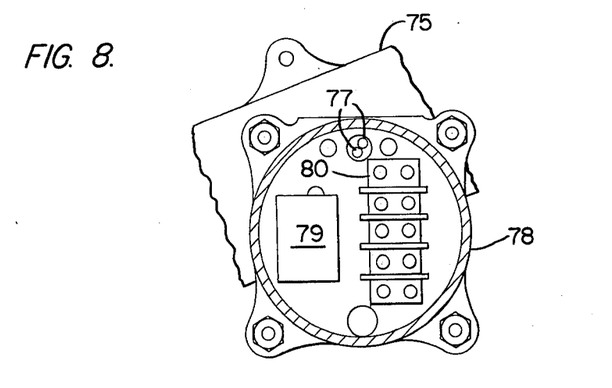
FIG. 8 is a vertical sectional view taken along lines 8—8 of FIG. 7.

Preferably mounted on a side of the housing 12 above the level of the sump 28, the drain valve 5 is connected to or communicates with the drain port 29 through a drain pipe or tube 51 having as its outer portion a T-shaped header 52 releasably mounting the drain valve and itself mounted on the housing by a mounting bracket 53. Spring closed, the drain valve 5 has a body or casing 54 capped at both ends and housing or containing in a horizontally disclosed axial bore 55 a differential piston 56. The bore 55, in sequence from one end, is divided axially or longitudinally into inlet and outlet chambers 57 and 58, respectively, straddling or on opposite sides of a valve seat 59, a guide chamber 60 and a pressure or actuating gas chamber 61. In turn, the differential piston 56 has a smaller head 62 contained in the inlet chamber 57 and carrying or fitted with a suitably arcuately convex "Teflon" plug 63 seatable in the seat 59, a shank portion 64 riding or sliding in the guide chamber 60 and bolted or otherwise connected through the valve seat to the smaller head, and a larger head 65 contained and riding or sliding in the pressure chamber 61 and carrying or fitted with a suitably rubber or like cup sealing gasket 66. The inlet and outlet chambers 57 and 58 are connected respectively to the adjoining end of the drain pipe 51 and a downwardly directed atmospheric exhaust or drain port 67, communication between which normally is blocked or closed by the seating of the smaller head 62 in the seat 59 under the yieldable force of a return spring 68 and an O-ring on the shank portion 64 blocks access between the outlet and pressure chambers 58 and 61 when, in the regenerating cycle of the associated filter unit 2a or b, the drain valve 5 is opened to drain collected contaminants and the low pressure regenerating gas to atmosphere through the drain port 67.

Actuating compressed gas for pneumatically opening the drain valve 5 against the yieldable resistance of the return spring 68, is both received in and exhausted from the pressure chamber 61 beyond or outwardly of the larger head 65 through an unobstructed actuating gas inlet passage 69, with the exhausting preferably supplemented by an outlet passage or opening 70 obstructed or blocked against entry of gas by a check valve 71 therein.

Figure 5:
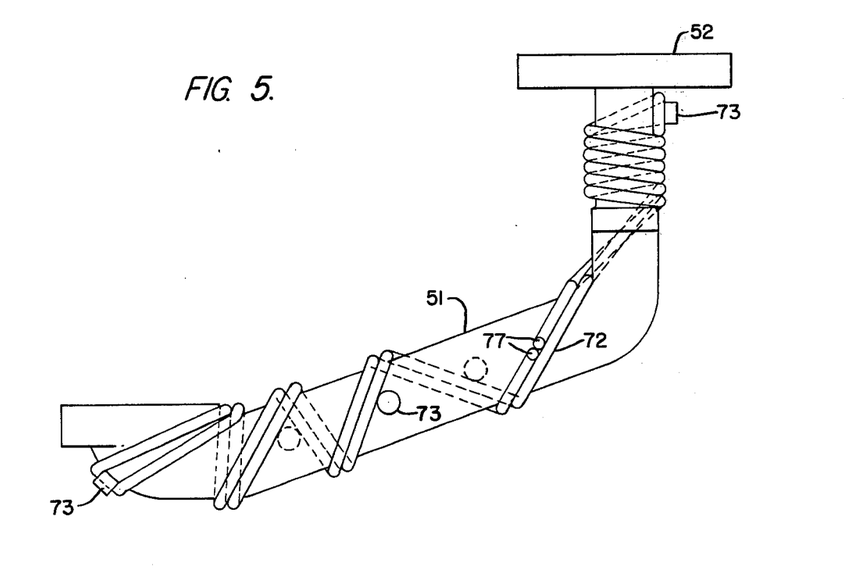
FIG. 5 is a side elevational view on an enlarged scale of the drain pipe and its heating coil shown in section in FIG. 3.
Figure 6:
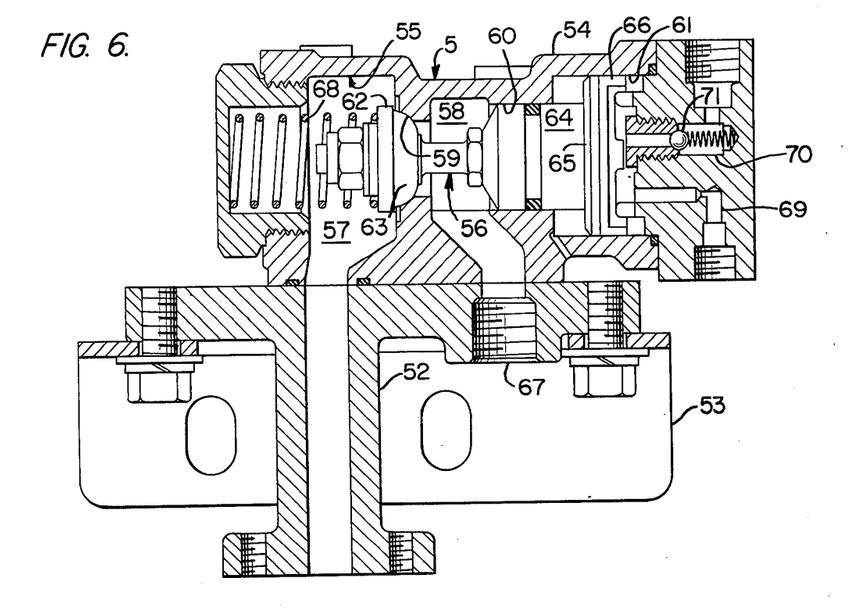
FIG. 6 is a vertical sectional view on the scale of FIG. 5, taken along lines 6—6 of FIG. 3.

With the drain valve 5 mounted or positioned above the level of the sump 28, the valve itself, when closed, will seldom if ever retain any contaminant content. However, since the drain pipe 51 is open to the drain port 29 in the housing 12 of the associated filter unit 2a or b, any contaminants collected in the sump 28 during the unit's filtering cycle are free to flow into and fill the drain pipe 51 up to their level in the sump. If, as in the exemplary installation in the compressed gas system of a diesel locomotive in which the principal contaminant in the compressed gas undergoing filtering is moisture, the drain pipe 51 unavoidably will contain water during the filtering cycle of its filter unit and in freezing weather the water will freeze and can burst the pipe. To avoid any likelihood of such freezing, there is provided for the drain pipe 51 a thermostatically controlled heater or heating coil 72 coiled or wrapped around the drain pipe 51, the heating coil conveniently in the form of a loop of coiled nichrome or like high-resistance wire, sheathed or covered by fiberglass or other heat-conducting, electrically-insulating material and looped or anchored at ends on positioning studs 73 on and outstanding from the drain pipe adjacent opposite ends thereof and therebetween wrapped or coiled around the pipe with the coils or wrappings increased toward the end adjacent the drain valve 5 for protecting the latter against any possibility of freezing. The drain tube 51 and heating coil or element 72 are covered with heat-insulating foam 74 for inhibiting loss of heat to ambient air and the foam is contained in and applied by injection into a suitably longitudinally split protective metal sheath or cover 75 having its opposite sides 76 preferably riveted together to prevent tampering. The ends or leads 77 of the heating coil 72 are led into a container or housing 78 conveniently mounted on a side of the sheath 75, the container containing in addition to a thermostat 79, a terminal block 80 for convenient connection of the heating coil and thermostat in series to a source of suitable electric power. Normally open, the thermostat or thermostatic switch 79 is predetermined to close and energize the heating coil 72 at a temperature somewhat above freezing, suitably on the order of around 35° F. (1 2/3° C) and to remain closed and hold the heating coil energized until the temperature of the ambient air rises above the predetermined temperature setting of the thermostat.

Figure 10:
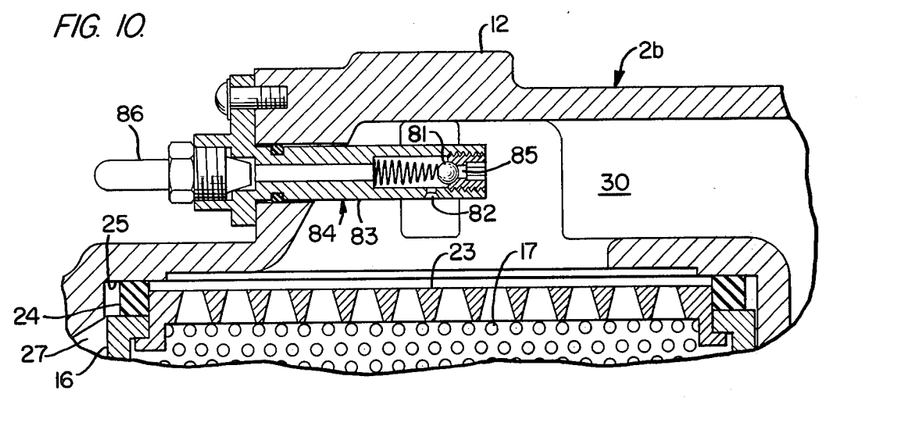
FIG. 10 is a fragmentary enlargement on the section of FIG. 3 of the top portion of the filter unit there shown.

The customary practice in both single and dual unit compressed gas filter assemblies of the desiccant type, followed with modifications even in my copending application, Ser. No. 766,437, is to divert part of the filtered compressed gas output of a filtering unit to a regenerating or purge tank for use in subsequent reverse-flow regenerating the desiccant in that unit during its regenerating cycle. Contrary to that practice, the assembly 1 of the present invention dispenses with a purge tank and, instead, diverts, directs or leads part of the gas filtered by whichever of the units 2a and b is in its filtering cycle directly to the other unit for reverse-flow regenerating of the desiccant 17 in the latter unit. To accomplish this, there is at or for each filter unit 2a or b an outlet check valve 81 combined with a bypassing inlet restricted orifice 82, both in and opening onto the outlet passage 30 in the upper portion or top of the housing 12 above the desiccant canister 16. Preferably having a common generally tubular body 83 sealingly insertable through a side of the outlet passage 30 removed from or opposite the outlet port 31, the combined check valve-restricted orifice or regenerating or purge gas valving 84 has the check valve 81 in the inner end portion of the body and the restricted orifice extending radially through a side of the body outwardly of the seat 85 of the check valve and opening or directed downwardly or inwardly onto the upper or outlet end 23 of the canister 16 and preferably in axial alignment or coaxial with or centered on the canister and the desiccant bed 17 therein. A pipe 86 connected to the outer ends of the bodies 83, directly connects the regenerating gas valvings 84 of the two filter units 2a and b.

With the regenerating gas valvings 84 directly connected, each of the filter units 2a and b in its filtering cycle will freely pass filtered compressed gas through its outlet check valve 81 to the restricted orifice 82 of the other filter unit and in its regenerating cycle restrictly pass such gas from the other unit through its restricted orifice 82. Metered in the part of the filtered compressed gas diverted from its outlet passage 30 for regenerating the desiccant 17 of the other filter unit by the cross-sectional area of the opening 85 in its outlet check valve 81 relative to that of the outlet port 31, either filter unit during its filtering cycle supplies filtered regenerating gas under substantially constant pressure to the other unit and maintains that pressure throughout its filtering cycle. Since derived from the pressure at which unfiltered compressed gas is fed to the filtering filter unit, and that pressure can range from the minimum to the maximum reservoir pressure of the system in which the assembly 1 is installed, the pressure at which filtered regenerating gas is supplied by the filtering unit to unit being regenerated will not be the same for all filtering cycles. However, although characterized as "substantially" constant, in a given filtering cycle the pressure at which the regenerating gas is supplied by the filtering unit generally will be constant, if, as usually will be the case, the filtering cycle is of short duration.

In its regenerating cycle, a filter unit 2a or b receives regenerating gas under substantially constant pressure from the then filtering other unit and, in passing the gas through its restricted orifice 82, causes the gas to expand and, with the drain valve 5 then open to atmosphere, reduces substantially to atmospheric the pressure of the regenerating gas passing through the desiccant bed 17 and scrubber 18 to the drain valve. The flow of gas through the restricted orifice 82 being substantially constant under the substantially constant pressure at which it is supplied by the other filter unit, the flow of low pressure regenerating gas through the desiccant bed 17 also will be substantially constant throughout the regenerating cycle, with consequent uniformity in the efficiency of the regenerating action of the gas on the desiccant. In addition, with the restricted orifice 82 coaxial with or centered on the desiccant bed 17 and the gas cooled as it expands on passing through the restricted orifice and applied through the foraminous upper end 23 of the canister 16 directly on the desiccant, the effect of the gas is not only to regenerate but also to cool the desiccant without wasting any cooling on the housing 12 and thus assist in countering or dissipating the heat generated by the exothermic reaction of the desiccant in adsorbing moisture or other contaminant during the filter unit's filtering cycle.

Figure 11:
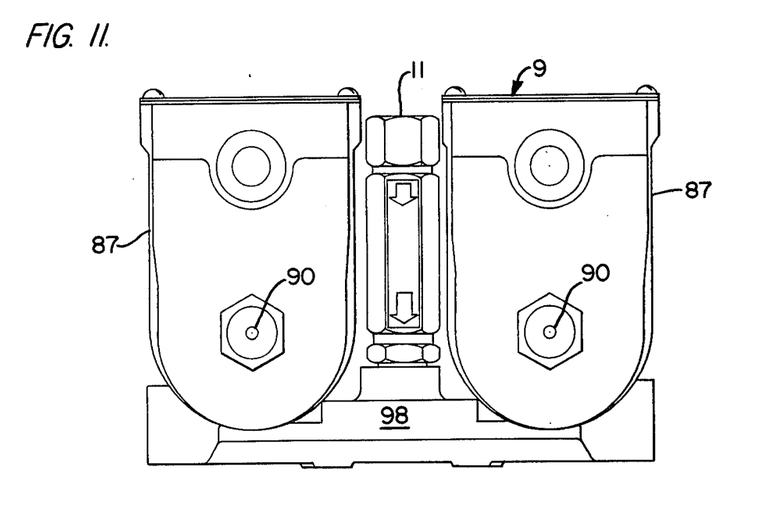
FIG. 11 is an enlarged front elevational view of the solenoid-actuated valve and regulator valve unit of FIG. 4.
Figure 12:
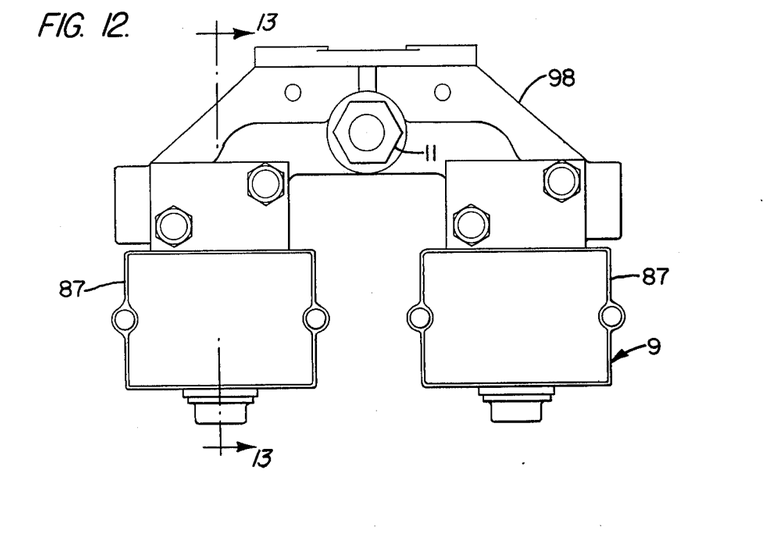
FIG. 12 is a plan view of the unit of FIG. 11.
Figure 13:
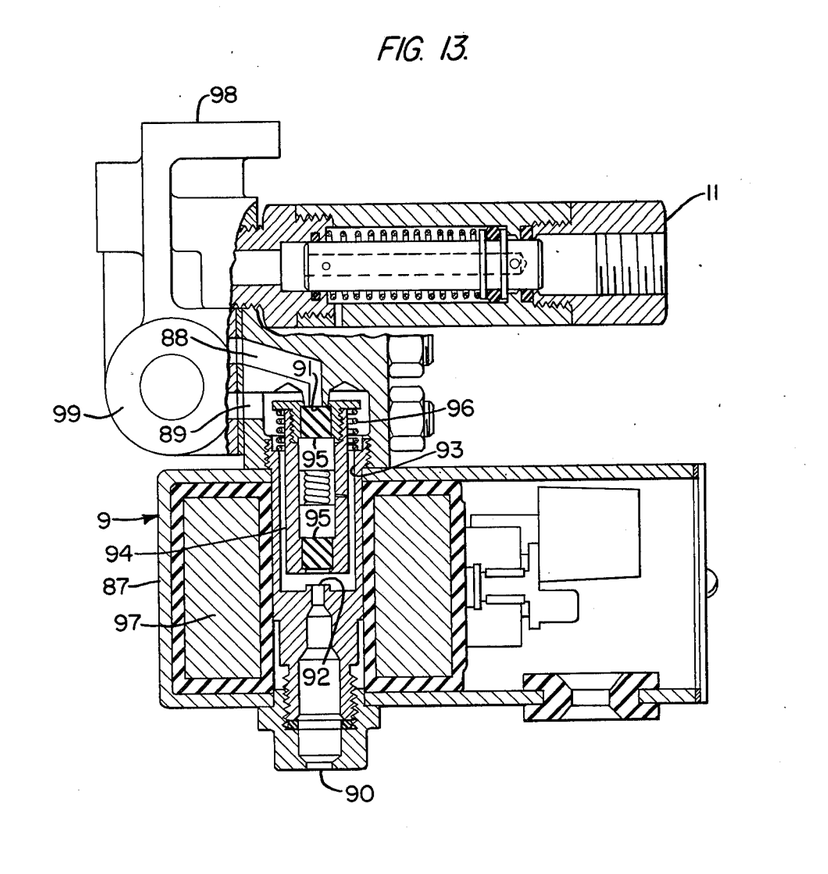
FIG. 13 is an end elevational view on a further enlarged scale of the unit of FIG. 11 with the regulator valve and adjoining solenoid-actuating valve shown in section, that for the solenoid-actuated valve taken along lines 13—13 of FIG. 12.

Shown in detail in FIGS. 11–13, the illustrated control valve 9 has for each of the filter units 2a and b a normally closed solenoid-actuated valve 87 generally similar to the valve disclosed in Frantz U.S. Pat. No. 2,887,126. With an inlet 88, an outlet 89 and an exhaust port 90, each valve 87 has opposed upper and lower valve seats 91 and 92, respectively, at opposite ends of a valve chamber 93 in which rides or reciprocates a plunger 94 having rubber plugs 95 in its opposite ends for alternately engaging and closing the valve seats. The plunger 94, under force of a return spring 96, normally closes the upper valve seat 91 for shutting off flow or fluid communication between the inlet and outlet 88 and 89, while at the same time connecting the outlet to the exhaust port 90 through the space in the valve chamber 93 around the plunger 94 and the lower valve seat 92. Alternately, on energizing of the solenoid 97, the plunger 94 is shifted or pulled downwardly to close the lower valve seat 92 and connect the inlet 88 to the outlet 89. A manifold 98 mounting the valves 87 and also the pressure regulator valve 11, connects the inlets 88 to a source of actuating compressed gas through the regulator valve and has separate outlet ports 99, each connected to one of the outlets 89.

With the preferred source of actuating gas either the common filtered gas output line 8 or, as illustrated, a tap 100 on the oulet side of the final filter 7, the pressure regulator valve 11 is able to sense a reduction from any cause in the pressure in the compressed gas system in which the assembly 1 is installed and by being normally open but closing at a predetermined dangerously low pressure, usually somewhere around 5 p.s.i. below the minimum reservoir pressure at which the associated compressor is preset to begin pumping, will then cut off the supply of actuating gas to both of the solenoid-actuated valves 87. With the solenoids 97 of its valves 87 alternately energized under control of the timer 10, the control valve 5 normally will alternately supply actuating gas to the filter units 2a and b in cycles of predetermined time duration, which in the exemplary installation suitably may be on the order of around 1 minute, but, when the pressure regulator valve 11 is closed, will simply continue to cycle without supplying actuating gas to either filter unit. The effect of this cutting or shutting off of actuating gas and also the normal action of the filter units under control of the control valve, will now be explained.

The schematic view of FIG. 4 shows not only the entire assembly 1 but, by lines, the pipe or fluid connections for flow of actuating compressed gas between the control valve 9 and the inlet, outlet and drain valves 3, 4 and 5, of each of the filter units 2a, and b, as well as the pipe connection 86 for flow of regenerating gas between the units, and by arrows on those lines, the direction of flow of gas therethrough when the filter unit at the left, designated as 2a, is in its regenerating cycle and the other filter 2b is in its filtering cycle. Each of the outlet ports 99 of the control valve is connected by one of the pipes 101 to the actuating gas inlet 49 of one of the inlet check valves 3. In turn, the outlet 50 of the inlet check valve 3 is connected to the inlet 49 of the outlet check valve of that filter unit by one of the pipes 102 and the outlet 50 of the outlet check valve is connected by one of the pipes 103 to the inlet passage 69 of the related drain valve 5.

Figure 9:
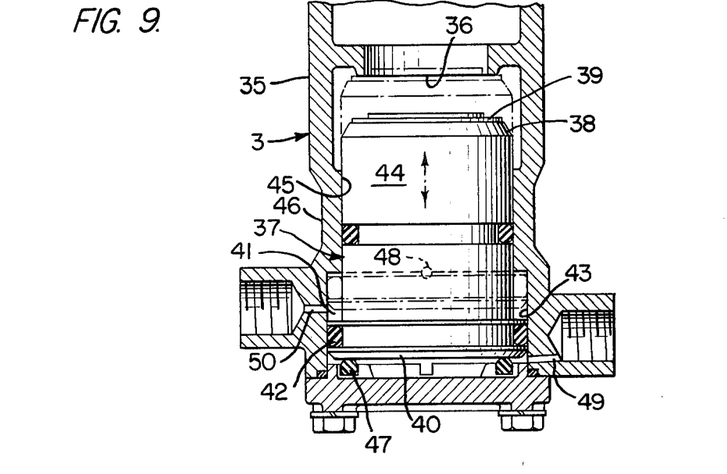
FIG. 9 is a vertical sectional view on the scale of FIG. 5, taken along lines 9—9 of FIG. 3.

With the inlet and outlet check and drain valves 3, 4 and 5 of each filter unit 2a or b thus connected in series and the inlet 49, outlet 50 and exhaust 48 of each of the inlet and outlet check valves 3 and 4 located or positioned vertically of the valve chamber 41 relative to each other and the open and closed positions of the larger head 40 of the piston 37 in the manner previously described and shown in FIG. 9, when, as indicated in FIG. 4, actuating gas is supplied by the control valve 9 to the filter unit 2a through the related pipe 101, the inlet check valve 3 of that unit must close before actuating gas can be passed through the pipe 102 to the outlet check valve 4 and the latter valve in turn must close before the actuating gas can pass through the pipe 103 to and open the drain valve 5. Since it is the opening of the drain valve 5 that initiates or begins the regenerating cycle of either filter unit, throughout the regenerating cycle of the housing 12 is blocked from entry through its inlet and outlet port 26 and 31 of unfiltered compressed gas upstream and filtered compressed gas downstream of the filter unit.

When, under control of the timer 10, the control valve 11 shuts off the supply of actuating gas to a filter unit at the end of the unit's regenerating cycle, the flow through the pipes 101, 102, and 103 is reversed, as indicated for the filter unit 2b in FIG. 4, for exhausting the previously supplied actuating gas from the unit's inlet, outlet and drain valves 3, 4 and 5 and the exhausting through these pipes is sequential, beginning with the inlet valve. Thus, on shutting off of the supply of actuating gas from the control valve 9, the inlet check valve 3 exhausts actuating gas through the pipe 101 to the related solenoid-actuated valve 87 and thence to atmosphere through latter valve's exhaust port 90, the outlet check valve 4 exhausts actuating gas through the pipe 102 to the inlet check valve and the drain valve 5 exhausts actuating gas to the outlet check valve through the unobstructed passage 61 and the pipe 103.

As soon as the force of the actuating gas on the larger head 40 of the piston 37 of the inlet check valve 3, is reduced by the exhausting below the force exerted on the piston's smaller head 38 by the unfiltered compressed gas from a main reservoir or other source, that valve opens and admits the unfiltered compressed gas to the housing 12, at which time the outlet check valve 4 can exhaust any residual actuating gas through the exhaust 48 of the inlet check valve, as can the drain valve 5 through the exhaust of the outlet check valve. With the inlet check valve 3 open, the incoming unfiltered compressed gas starts to flow through the housing and on reaching the outlet check valve 4 as filtered compressed gas, applies to the presented smaller head 38 of the valve's piston 37, the force required to open that valve, whereupon filtered compressed gas flows from the filter unit 2b to the output line 8 either directly or, as illustrated, through the final filter 7. Rather than depending wholly upon exhausting actuating gas in sequence through the outlet and inlet check valves 4 and 3 and related solenoid-actuated valve 87 of the control valve 9, with consequent possible delay in its closing, the drain valve 5 has its outlet passage 70 connected by the pipe 104 to the supply pipe 101 for bypassing the inlet and outlet check valves and exhausting directly through the control valve, thus ensuring that the drain valve will be closed under the force of its spring 68 before it is reached by incoming compressed gas admitted to the housing 12 through the inlet check valve 3.

The foregoing connections and constructions of the inlet, outlet and drain valves 3, 4 and 5 of each filter unit, while described for the filter units 2a and b of the illustrated dual filter assembly 1, are equally applicable to a filter unit of a single unit assembly in which the actuating gas for initiating and maintaining the regenerating cycle of the filter unit usually will be supplied from the governor line (not shown) of the associated compressor (not shown) during the compressor's idling cycle. In either case, the arrangement ensures that the inlet and outlet check valves 3 and 4 will close before opening and open after closing of the drain valve 5, thereby preventing loss of compressed gas from the system in which the filter assembly is installed except for the relatively small amount used for regenerating the desiccant 17. On the other hand, the pressure regulator valve 11 for shutting off the supply of actuating compressed gas, when, due to a break in a line or during the initial pump-up by the associated compressor, the pressure in the system falls or is below a predetermined low level, is peculiar or limited in its application to a dual filter assembly.

As previously explained, the control valve 9 in alternating, a cycles determined by the setting of the timer 10, the supply of actuating gas to the inlet, outlet and drain valves 3, 4 and 5 of the filter units 2a and b, causes one of the filter units to be regenerated while the other is filtering and vice versa and thus produces a continuous output of filtered gas for the intended use. However, when for any reason the pressure in the system falls or is below the low level at which the pressure regulator valve 11 is pedetermined to close, the alternate filtering and regenerating of the filter units, by limiting the output of the filtered compressed gas to the net output of one unit and diverting part of the unit's gross output for regenerating, can be inadequate to meet an urgent demand for filtered gas imposed at that time, such, in the exemplary installation in a diesel locomotive compressed air system, as an essential application of the air brakes. Since, absent a supply of actuating compressed gas, the inlet and outlet valves 3 and 4 of each of the units will be open and its drain valve 5 closed, the effect of the pressure regulator valve 11 in shutting off or interrupting the supply of actuating gas to both units is to prevent either unit from being regenerated and maintain both units in their filtering cycles or modes for simultaneously filtering incoming unfiltered compressed gas. Consequently, so long as the pressure regulator valve is closed, substantially all of the input of compressed gas to the assembly 1 is made available for product use as the combined gross filtered gas output of both units.

In addition to guarding against a low pressure in the system in which it is installed, the assembly 1 preferably is safeguarded against tampering, in part by riveting together the sides 76 of the metal sheath 75 of the drain pipe 51. The other preferred safeguard is to assemble the various components of the dual filter assembly 1, including the pipe connections, at the factory and use for the pipe connections 101-104 pipes of different size to avoid misconnection in the field of the inlet, outlet check and drain valves 3, 4 and 5, the previously described connection of which is critical to the assembly's intended operation.

From the above detailed description it will be apparent that there has been provided an improved desiccant-type compressed gas filter assembly having certain features applicable to either single or dual filter assemblies and particularly featuring a connection of filtered gas outlets of alternately filtering units of a dual filter assembly such that a purge tank is dispensed with and regenerating gas is supplied directly and under substantially constant pressure by the then filtering unit to the unit being regenerated. It should be understood that the described and disclosed embodiment is merely exemplary of the invention and that all modifications are intended to be included that do not depart from the spirit of the invention and the scope of the appended claims.

Having now described my invention, I claim:

1. A compressed gas filter assembly comprising filter unit means having housing means containing a desiccant and fitted with pneumatically opened and closed inlet and outlet check valve means and pneumatically opened spring-closed drain valve means for respectively passing unfiltered gas to and filtered gas from and draining any collected contaminant from said housing means, said filter unit means alternating between filtering cycles wherein said inlet and outlet valve means are open and said drain valve means closed and regenerating cycles wherein said inlet and outlet valve means are closed and said drain valve means open in response to exhausting of actuating compressed gas from said inlet and outlet valve means and supply of said gas to said drain valve means, and means so connecting all of said valve means to each other and a source of actuating compressed gas as to cause said inlet and outlet valve means to open after closing and close before opening of said drain valve means.

2. A filter assembly according to claim 1, wherein the filter unit means is a pair of filter units, and the housing means, inlet and outlet check valve means and drain valve means are each a pair respectively of housings, inlet and outlet valves and drain valves, one for each filter unit, and the assembly includes control valve means connected to a source of actuating compressed gas for alternately supplying said gas to said filter units and thereby causing said filter units alternately to receive and filter unfiltered compressed gas from a source thereof, means connected to a filtered gas outlet of each unit for passing filtered gas freely from and restrictedly to said outlet, and means connecting said passing means for enabling each filter unit during a filtering cycle thereof to pass filtered gas under substantially constant pressure to the other unit for regenerating the desiccant therein.

3. A filter assembly according to claim 2, wherein the control valve means are solenoid-actuated valve means, and the assembly includes timer means for predeterming the duration of energized and deenergized cycles of said solenoid-actuated valve means.

4. A filter assembly according to claim 3, wherein the solenoid-actuated valve means is a pair of normally closed alternately energized solenoid-actuated valves each fluid-connected to the inlet, outlet and drain valves of one of the filter units.

5. A filter assembly according to claim 2, wherein the inlet and outlet check valves and drain valve of each unit are connected in series to each other and the control valve means in a sequence of inlet valve, outlet valve and drain valve for alternately receiving actuating compressed gas from the control valve means in said sequence and exhausting said gas to the control valve means in the reverse of said sequence.

6. A filter assembly according to claim 5, including for the drain valve of each filter unit an unobstructed passage for receiving and exhausting compressed gas from and to the outlet valve, and a check valve-obstructed passage connected to the control valve means for bypassing the inlet and outlet valves and exhausting actuating gas directly to the control valve means.

7. A filter assembly according to claim 6, wherein the control valve means are solenoid-actuated valve means, and the assembly includes timer means for predetermining the duration of energized and deenergized cycles of said solenoid-actuated valve means.

8. A filter assembly according to claim 7, wherein the control valve means for a source of supply of actuating compressed gas is connected to a filtered gas output of the assembly, and the assembly includes a pressure regulator valve in the connection of the control valve means to said source for shutting off the supply of said gas to the control valve means and forcing the filter units simultaneously to filter incoming unfiltered compressed gas when the pressure of said filtered gas from said source is below a predetermined level.

9. A filter assembly according to claim 1, wherein the housing means includes sump means for collecting contaminants separated from the unfiltered gas and drain port means through which contaminants are drained from said sump means, and the drain valve means is mounted exteriorly on the housing means above the level of said sump means, and said assembly includes drain pipe means open to said drain port means and connecting said drain valve means thereto, and thermostatically controlled heating means on said drain pipe means for preventing freezing in cold weather of any freezable liquid contaminant contained in said drain pipe means during filtering cycles of the filter unit means.

10. A filter assembly according to claim 9, wherein the heating means is a heating coil wrapped around the drain pipe means, and the assembly includes a thermostat mounted in a casing on the drain pipe means and wired in series with said heating coil for energizing said coil when ambient temperature drops to a predetermined level.

11. A filter assembly according to claim 10, including a protective sheath enclosing said drain pipe means and heating coil and mounting said thermostat casing, and heat-insulating foam in and spacing said sheath from the drain pipe means and the heating coil wrapped therearound.

* * * * *